Patented Aug. 1, 1939

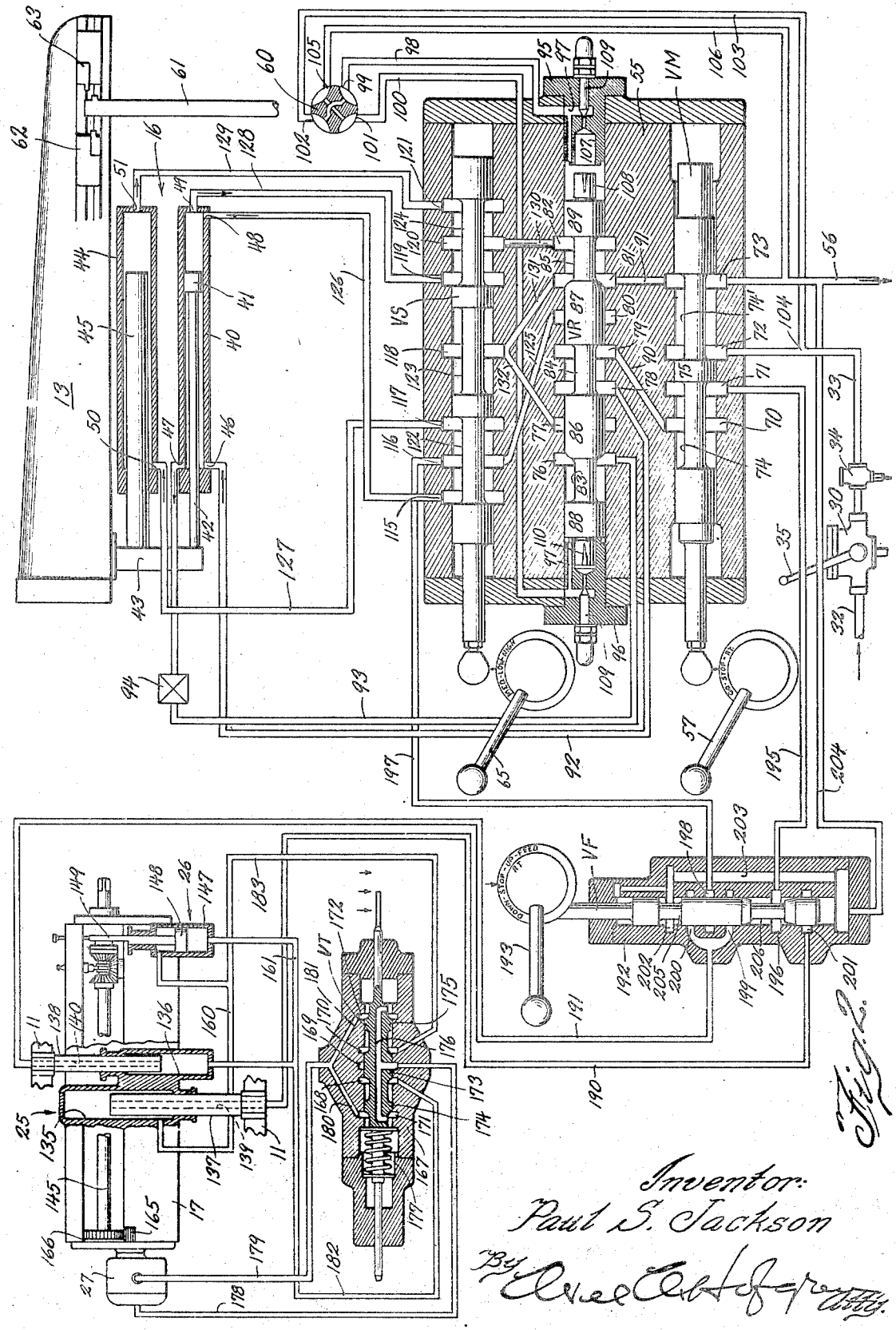

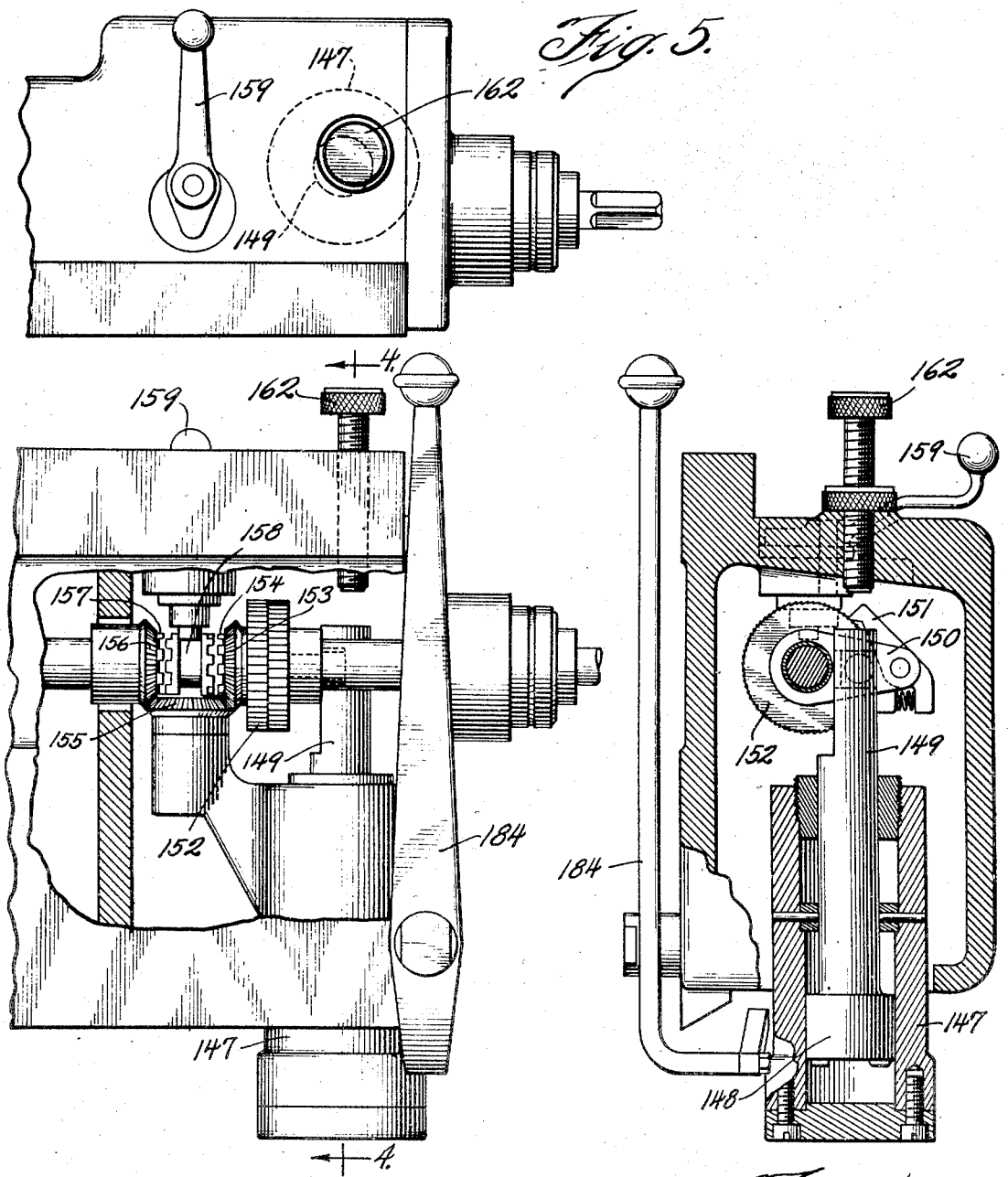

2,167,890

UNITED STATES PATENT OFFICE 2,167,890

HYDRAULIC MACHINE TOOL

Paul S. Jackson, Rockford, Ill., assignor to Rockford Machine Tool Company, Rockford, Ill., a corporation of Illinois Application August 27, 1935, Serial No. 38,056

40 Claims. (Cl. 90—33)

The invention relates generally to machine tools and particularly to a hydraulic circuit for machine tools of the continually reciprocating type such as planers, shapers, and the like.

In machines of the character described it is common practice to effect reciprocation by a double acting piston and cylinder device. The cylinder of the device has but a single connection at each end through which both a charge of operating fluid into the cylinder to impart a working stroke to the piston and the exhaust of the fluid from the cylinder upon the return stroke of the piston takes place. There is thus a constant surging back and forth of the operating fluid in the cylinder and in the conduit system supplying the cylinder, with the result that the fluid becomes heated with its attendant undesirable effects, and that a portion of the fluid is trapped in the cylinder.

It is an object of this invention to perfect a system for operating machines hydraulically, in which this surging of the operating fluid in the system is avoided.

More particularly it is an object of the invention to perfect a circuit for a machine tool having a continually reciprocating member driven by a reciprocating hydraulic motor, in which the operating fluid moves in one general direction only through the circuit and the motor.

Another object is to provide a hydraulic system for a machine tool having novel and improved valve means for controlling the reversal and rate of movement of the reciprocating member of the machine.

Yet another object is to provide in a shaper, or the like, a vertically adjustable, work supporting rail having a piston and cylinder means for raising the rail and a similar means for lowering the rail, the pistons of said means being fixed at opposite ends in the frame of the machine, and operating fluid supply ducts for said means extending through the pistons from the fixed ends thereof.

A further object is to provide in a machine tool having a rail mounted for vertical adjustment and a work supporting table slidable horizontally on the rail, a hydraulic motor for raising or lowering the rail, a hydraulic motor for rapid traversing the table, and a hydraulic motor for effecting feed of the table all supplied with fluid from common rigid connections.

Yet a further object is to provide a work supporting table fed by a motor clutched to the table driving mechanism and rapidly traversed by a reversible hydraulic motor permanently connected to the table driving mechanism and controlled by a valve which in neutral position permits of unrestrained circulation of fluid through the valve and the traverse motor enabling free rotation of the traverse motor in either direction when the table is being fed by the feed motor.

Other objects and advantages will become apparent from the following detailed description, taken in connection with the accompanying drawings, in which:

Fig. 2 is a diagrammatic view of the hydraulic circuit of the machine tool shown in Fig. 1.

Fig. 3 is an enlarged detail view partially in section showing the feeding mechanism for the work table.

Fig. 4 is also an enlarged detail view also showing the work table feeding mechanism and taken approximately in a plane along line 4—4 of Fig. 3.

Fig. 5 is a horizontal plan view of the construction shown in Fig. 3.

Figure 1:
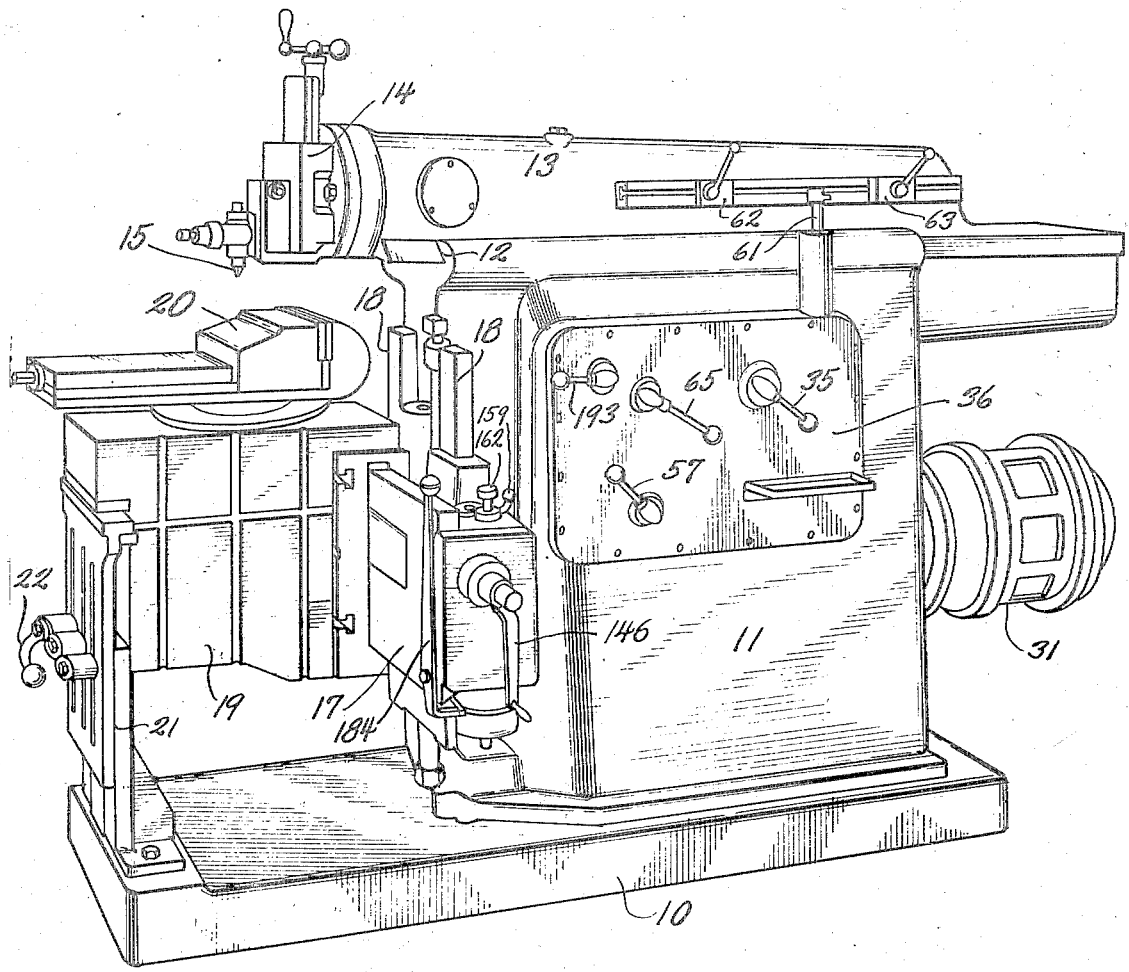
Fig. 1 is a perspective view of a machine tool embodying the features of this invention.

While the invention is susceptible of various modifications and alternative constructions, it is here shown and will be described hereinafter in a preferred embodiment, but it is not intended that the invention is thereby to be limited to the specific construction disclosed but it is intended to cover all modifications and alternative constructions falling within the spirit and scope of the invention as defined by the appended claims.

General construction

For purposes of disclosure, the invention is here shown and will be described hereinafter as embodied in a shaper having an elongated bed 10 with a column 11 upstanding from the rear of the bed and housing the major portion of the operating mechanism. Reciprocable longitudinally of the bed in ways 12 formed on the top of the column is a carrier or ram 13, equipped at its forward end with conventional mechanism 14 for adjustably supporting a tool 15. The ram 13 has a forward cutting or feed stroke and a rearward traverse or return stroke and is reciprocated by hydraulic means generally designated 16 (Fig. 2) which, in the present instance, is composed of a plurality of motors operable to drive the ram at any one of three cutting or feed speeds and to return the ram at rapid traverse speed.

Located at the front of the machine is the work supporting unit comprising a rail 17, mounted for vertical sliding movement on ways 18 formed on the front face of the column 11, and a table 19 supported on the rail 17 for movement transversely of the bed and of the path of reciprocation of the ram 13. The rail 17 is adjusted vertically, to position the work at the proper elevation, by means of a hydraulic motor 25 and when so adjusted is clamped in position by conventional means, not shown. Movement of the table in either direction transversely of the path of reciprocation of the ram 13 is imparted by either of two hydraulic motors 26 and 27 supported on the rail 17. The motor 27 is manually controlled and is provided for imparting a rapid traverse movement to the table for initially positioning the work horizontally with respect to the tool or for returning the table to initial position after completion of a work piece. The motor 26, on the other hand, is automatically controlled and imparts an intermittent feed movement to the table 19 in timed relation with the reciprocation of the ram 13. In the present instance such feed of the table takes place just prior to a cutting stroke of the ram. The table preferably carries a vise 20 in which the work piece is clamped, and a telescoping bracket 21, clamped or unclamped by lever 22, rises from the extreme forward end of the bed 10 to provide a support for the forward end of the table and is adjusted to the desired height after the rail 17 has been clamped in adjusted position.

Operating fluid, oil being commonly employed, is supplied to the various motors by a pump 30 located within the column 11 and driven by an electric motor 31 mounted on the rear face of the column. The pump 30 draws fluid from a reservoir not shown through a pipe 32 and discharges the fluid at high pressure through a pipe 33 to a conduit system leading to the various hydraulic motors mentioned. A relief valve 34 is interposed between the pump and the pipe 33 and opens to discharge fluid directly to the reservoir when the back pressure in the conduit system exceeds a predetermined value. While for any one setting, the pump 30 delivers a constant volume of fluid, the quantity of fluid discharged by the pump may be varied by shifting a control handle 35 mounted on a control panel 36 located on the side of the column 11.

The course of the fluid through the conduit system is controlled by manually and automatically operable valves to obtain the movements of the various parts as above described. To that end the valves are manually positionable to direct operating fluid to the motors of the work supporting unit only or to both the work supporting unit and ram actuating means 16. When directed to the motors of the work supporting unit only, the ram, of course, is idle and the fluid is further controlled by manual valves to raise or lower the rail when it is unclamped, and to rapidly traverse the table in either direction when the rail is clamped in position. When the fluid is directed to both the work supporting unit and means 16, an automatic reversing valve further controls the fluid to effect reciprocation of the ram 13 and intermittent actuation of the table feed motor 26 prior to each cutting stroke of the ram.

*Ram reciprocating means*

As previously stated the hydraulic means 16 for reciprocating the ram 13 really is composed of a plurality of motors operable to drive the ram at any one of three feed speeds and to return the ram at rapid traverse speed. Two of these motors are formed by a double acting piston and cylinder device comprising a cylinder 40 rigid in the column 11 and a piston 41 having a fluid-tight fit in the cylinder and connected by a rod 42 to a bracket 43 depending from the ram 13. The third motor comprises a cylinder 44 fixed in the column 11 and a piston 45 of uniform diameter throughout its length and projecting through one end of the cylinder into engagement with the bracket 43. This piston 45 has a loose fit within the cylinder 44 so as to permit the passage of fluid along the cylinder between the cylinder and the piston. Both the cylinder 44 and the piston 45 are substantially larger in diameter than the cylinder 40 and the piston 41 so as to have a larger fluid capacity than the head end of cylinder 40, which in turn has a larger capacity than the rod end thereof. Because of the different fluid capacities the motors have a rate of movement inversely proportional to their capacity when supplied from the constant displacement pump 30. Thus by directing the fluid to the head end of the cylinder 40, to cylinder 44 or to both, three cutting speeds of the ram are obtained. By directing the fluid to the rod end of cylinder 40 a return of the ram is obtained at a rate many times that of the fastest cutting speed.

In order that surging of the operating fluid in the conduit system and the motors may be avoided the cylinders 40 and 44 are each provided with a number of ports such that the fluid may have a substantially unidirectional flow. To that end the cylinder 40 is provided with an intake port 46 at one end through which fluid is supplied for the purpose of retracting the ram and is provided at the same end with a port 47 through which the fluid is discharged when the piston 41 is moved in the opposite direction. The opposite end of cylinder 40 is likewise formed with an intake port 48 and a discharge port 49. Because the larger cylinder 44 is part of a single acting motor, it has only an inlet port 50 at one end and a discharge port 51 at the other.

*Ram circuit and control means*

Supply of operating fluid to the various ports of the means 16 is controlled by three valves VM, VR and VS, each disposed in a bore in a common housing 55. The valve VM is the main control valve for the conduit system and has three positions. In the position shown in Fig. 2, it is in "stop" position in which fluid from the pump 30 is cut off from the conduit system and immediately returned by means of a pipe 56 to the reservoir. When moved to the extreme right, as viewed in Fig. 2, the valve is in "go" position, permitting fluid to be supplied to the entire conduit system. When moved to the extreme left, the valve is in "rapid traverse" position in which it permits of the supply of fluid to the motors of the work supporting unit, but cuts off the supply of fluid to the means 16. The valve is moved to its various positions by means of an operating handle 57 mounted on the control panel 36.

The valve VR is a reversing valve and functions to direct the operating fluid alternately to the opposite ends of the cylinder 40 and to the cylinder 44 so as to effect reciprocation of the pistons 41 and 45 and the ram 13. In the position shown in Fig. 2 the valve is in "return" position and directs fluid to the rod end of cylinder 40 to cause a return stroke of the ram 13. When shifted to the extreme right the valve would be in "forward" position and would cause fluid to be supplied to the remaining motors of the means 16 in a manner to effect a forward or cutting stroke of the ram 13. The position of the valve VR is automatically governed by the ram 13 itself through a pilot valve 60 actuated by a trip lever 61 controlled by dogs 62 and 63 adjustably mounted on the ram 13.

The valve VS controls the speed of the forward or cutting stroke of the ram and for that stroke is superimposed upon the control by the reversing valve. As shown in Fig. 2, the valve is in "low" position in which operating fluid is supplied to both the head end of the cylinder 40 and cylinder 44, resulting in a low speed because the pump 30 must supply fluid for the combined capacities of those motors. When moved to the extreme right, as viewed in Fig. 2, the valve is in "medium" position and permits the supply of fluid to cylinder 44 only, thus producing a medium cutting speed because only the larger cylinder 44 must be supplied with fluid. When moved to the extreme left, the valve is in "high" position and permits the supply of fluid to the head end of the smaller cylinder 40 only, thus still further increasing the cutting speed because of the reduced capacity of the cylinder 40. The valve VS is manually controlled by an operating lever 65 also mounted on the control panel 36. Shifting of the valve VS to any one of its three positions does not vary the speed of the return stroke of the ram 13, such return being at the same speed for all positions of the valve VS and substantially higher than the maximum forward speed of the ram because of the relatively small capacity of the rod end of the cylinder 40.

Specifically the bore in which the valve VM reciprocates is formed with annular ports 70, 71 and 72 equally spaced one from the other and an annular port 73 spaced from the port 72 a distance twice that between the other ports. The valve VM proper is formed with two annular grooves 74 and 74' of equal length and separated by a land 75 equal in width to the distance between the equally spaced ports 70, 71 and 72. The port 72 connects with the supply pipe 33 from the pump 30, while port 73 communicates with the drain pipe 56.

The bore in which the valve VR reciprocates is formed with annular ports 76, 77, 78, 79, 80, 81 and 82, all equally spaced. The valve proper is formed with annular grooves 83, 84 and 85 of a length sufficient to embrace two adjacent ports and equally spaced and divided by lands 86 and 87 approximately equal in length to the distance between alternate ports. Lands 88 and 89 at the ends of the valve form pistons with which fluid directed by the pilot valve 60 reacts to shift the valve. A duct 90 connects port 70 with the port 79 and a duct 91 connects port 81 with port 73 and thus to the drain pipe 56. Port 78 is connected by a conduit 92 with the intake port 46 of the cylinder 40 while the exhaust port 47 of the cylinder 40 is connected by a conduit 93 with the port 76. Conduits 92 and 93 constitute a first branch circuit leading from the reversing valve and are directly and entirely controlled thereby. A back pressure valve 94 is disposed in the conduit 93 to assure the operation of the table feeding motor as will be described hereinafter.

Plugs 95 and 96 each having a passage 97 formed therein close the bore in which the valve VR reciprocates. The passage 97 of the plug 95 communicates by means of a conduit 98 with a port 9 of the pilot valve 60 while the passage 97 of the plug 96 communicates by means of a conduit 100 with a port 101 of the pilot valve. Leading from a port 102 of the pilot valve is a conduit 103 connecting at 104 with the supply pipe 33. A port 105 communicates by means of a conduit 106 with the drain pipe 56. The pilot valve is of well known construction and in the position shown connects port 102 with the port 99 so as to permit fluid from the pump 30 to be discharged through the plug 95 to move the valve VR to its return position, at the same time connecting ports 101 and 105 to permit the discharge of fluid from the other end of the bore through the plug 96. The valve 60 is rotated through 45° C. by the dog 62 and in that position connects the ports so as to supply fluid to the plug 96 and thus shift the valve VR to its forward position.

In order to avoid the noise incident to the arresting of the valve VR at the end of its movements, means is provided for gradually retarding the movement of the valve. In the present instance this means takes the form of inwardly opening cylindrical sockets 107 formed in the plugs 95 and 96 to receive reduced projections 108 on the ends of the valve VR. The reduced projections 108 trap fluid in the recesses 107 which fluid is gradually discharged through a restricted passage controlled by a needle valve 109. The projections 108 are formed with V-grooves 110 further to regulate the amount of oil trapped in the recesses 107.

The bore in which valve VS reciprocates is formed with annular ports 115, 116, 117, 118, 119, 120 and 121. Of these ports 115, 116 and 117 are equally spaced with respect to one another, and ports 119, 120 and 121 are equally spaced with respect to one another, while port 118 is spaced midway between ports 117 and 119, a distance approximately twice the distance between any of the remaining ports. The valve VS proper is formed with annular grooves 122, 123 and 124, equal in length and long enough to embrace three of the equally spaced ports. Port 116 is connected by a duct 125 to port 80 of the reversing valve to receive operating fluid therefrom when in "forward" position. Ports 115 and 117 are connected by conduits 126 and 127, respectively, to the intake port 48 of the cylinder 40 and the intake port 50 of the cylinder 44. Return conduits 128 and 129, respectively, connect exhaust port 49 of cylinder 40 and exhaust port 51 of cylinder 44 with ports 119 and 121. Port 120 is connected by duct 130 to port 82 and port 118 is connected by duct 131 to port 81 to complete the system for returning the fluid from ducts 128 and 129 to the reservoir. Duct 132 connects port 77 and port 118 to provide for the return of fluid from the rod end of cylinder 40 when the reversing valve is in "forward" position. It will be seen from the foregoing that ducts 125, 130 and 131 and the conduits connecting valve VS and cylinders 40 and 44 constitute a second branch circuit leading from the reversing valve to the means 16 and that the valve VS is interposed in the circuit and superimposes its control on that of the reversing valve.

Rail adjusting means

As previously stated, rail 17 is vertically movable and is adjusted by means of a hydraulic motor 25. In addition the rail 17 carries a hydraulic motor for feed movement of the table 19 and a hydraulic motor 27 for imparting a rapid traverse movement to the table 19. A novel construction is employed in order that the hydraulic motors of the work supporting unit may be supplied without the necessity of flexible connections. To that end the motor 25 comprises a large cylinder 135 and a parallel smaller cylinder 136 both integral with the rail 17. The cylinder 135 opens downwardly and receives a piston 137 fixed at its lower end in the column 11. The cylinder 136 opens upwardly and receives a piston 138 likewise fixed at its projecting end in the column 11. Fluid is supplied to the cylinders through ducts 139 and 140 extending longitudinally through the pistons 137 and 138 respectively. Thus it will be seen that the conduits for supplying fluid to the cylinder 135 and the cylinder 136 may be rigid. The large cylinder 135 is employed for raising the rail and the smaller cylinder 136 is employed for lowering the rail. Conventional means not shown is provided for clamping the rail in adjusted position.

Feed of table

Feed of the table 19 transversely of the machine is effected by means of a screw shaft 145 journaled in the rail and cooperating with the customary nut on the table, not shown. Rotation may be imparted to the shaft manually through a crank 146 adapted to cooperate with a projecting end of the shaft, but is normally imparted in timed relation to the reciprocation of the ram 13 by the motor 26. This motor comprises a cylinder 147 fixed on the rail and a piston 148 having a rod 149 projecting through the upper end of the cylinder and into engagement with an arm 150 (see Fig. 4) rotatable on the end of the shaft 145 and carrying a pawl 151. This pawl is spring pressed into engagement with a ratchet 152 also rotatable on the shaft and formed with a bevel gear 153 and clutch teeth 154. The bevel gear 153 meshes with a reversing bevel gear 155 which in turn meshes with a bevel gear 156 rotatable on the shaft 145 and carrying clutch teeth 157. Keyed to the shaft 145 is a clutch 158 shiftable axially by means of a lever 159 from neutral into engagement with either the clutch teeth 154 or the clutch teeth 157 so as to impart either a right hand or left hand rotation to the shaft 145 and thus move the table transversely of the machine in either direction.

The upper or rod end of the cylinder 147 is connected by a conduit 160 to the cylinder 135 and the lower end of the cylinder 147 is connected by a conduit 161 to the cylinder 136. It will be noted that the conduit 160 is connected to that end of the cylinder 147 through which the rod 149 projects and thus the fluid acts upon a smaller piston area than does the fluid supplied through the conduit 161 so as to produce a differential piston. As will be shown hereinafter, the conduit 160 during normal operation of the machine, is always at pump pressure, while the conduit 161 is alternately connected to pump pressure just prior to forward movement of the ram 13, at which time, because of the differential construction, the piston 148 is forced outwardly to rock the pawl 151 and rotate the ratchet 152. The pump pressure in conduit 160 will, of course, return the piston immediately when pump pressure is cut off from the conduit 161. The extent of rotation imparted to the shaft 145 upon each actuation of the piston 148, and consequently the extent of feed of the table 19, is determined by an adjusting screw 162 against which the end of the piston 149 abuts.

Rapid traverse of table

Rapid traverse of the table 19 in either direction is effected by the reversible, rotary hydraulic motor 27 which carries a pinion 165 meshing with a gear 166 fast on the end of the shaft 145. The motor receives operating fluid through the cylinders 135 and 136 so as not to require any flexible connections and is controlled by a valve VT of the open center type also mounted on the rail 17. Providing a bore in which the valve VT operates is a casing 167 having annular ports 168, 169 and 170 equally spaced and located substantially centrally of the valve casing. Spaced respectively from the ports 168 and 170 approximately twice the distance between the equally spaced ports are annular ports 171 and 172. The valve VT proper is provided with a central land 173 and lands 174 and 175 spaced inwardly from the ends of the valve so as to provide four annular grooves. In addition the valve is provided with a longitudinal central passage 176 opening radially outwardly beyond the lands 174 and 175, and radially through the land 173. The valve is loaded by a spring 177 normally to assume its central or neutral position, as shown in Fig. 2.

Port 169 of the valve is connected by means of a conduit 178 with one port of the motor 27, the opposite port of the motor being connected by a conduit 179 and branch passages 180 and 181 with the ports 171 and 172, respectively. Port 168 connects by means of a conduit 182 with the conduit 161 so as to receive fluid from or discharge fluid to the cylinder 136, while port 170 connects by means of a conduit 183 with the conduit 160 so as to communicate with cylinder 135. In the neutral position of the valve VT fluid is free to circulate through the motor 27 and the valve so that the motor, which is permanently connected to the shaft 145, may be driven without opposition as the shaft is rotated for feeding the table. By shifting the valve to the right or to the left, the motor 27 is driven in forward or reverse directions so that the table may be traversed in either direction. The valve VT is shifted to its operative positions by means of a lever 184 pivotally mounted on the rail and suitably connected to the valve.

Control of rail unit motors

It will be apparent from the foregoing that the table feed motor 26, the rapid traverse motor 27 and the valve VT are all mounted on the rail 17 and receive operating fluid from the rail motor 25, the pistons 137 and 138 of which are fixed in the column 11 so that no flexible connections are required. Fluid is supplied to the passages 139 and 140 in the pistons of the rail motor 25 through conduits 190 and 191 terminating at their other ends in the casing 192 of a valve VF. This valve is the main control valve for selecting the operation of the table feed motor 26 or the rapid traverse motor 27 and the direction of movement of the rail by the motor 25. To that end the valve has four positions: a "stop" position, the position shown in Fig. 2, in which all operating fluid is cut off; a "rail-down" position in which fluid is supplied to the small cylinder 136; a "rail-up" and "rapid-traverse" position in which fluid is supplied to the large cylinder 135 to raise the rail, or when the rail is clamped and the valve VT actuated to supply fluid to the rapid traverse motor 27; and a "feed" position in which fluid is supplied to the feed motor 26. The valve is moved to its various positions by means of a control handle 193 mounted on the panel 36.

Operating fluid is supplied to the valve VF from two sources. A constant supply is obtained through a conduit 195 communicating at one end with the port 71 controlled by the valve VM and at the other end with an annular port 196 in the casing 192. An intermittent supply is obtained through a conduit 197 communicating at one end with the port 116 controlled by the valve VS and communicating at the other end with an annular port 198 in the casing 192. Equally spaced on opposite sides of the port 198 are ports 199 and 200 connected by branch passages to the conduit 191. Spaced downwardly, as viewed in Fig. 2, from the port 196 is an annular port 201 communicating with the conduit 190, and spaced upwardly from the port 200 is an annular port 202 communicating with a bypass passage 203 discharging into the end of the casing which connects by means of a conduit 204 with the drain pipe 56.

The valve VF proper is formed with an annular groove 205 and an annular groove 206, the latter being so positioned and of such length that in the "rail-down" position of the valve the groove provides communication between ports 196 and 199, and in the "rail-up" and "feed" positions provides communication between the ports 196 and 201. The land formed intermediate the grooves 205 and 206 is of sufficient length to close ports 198, 199 and 200 when the valve is in "stop" position. It will be seen from the foregoing that the intermittent supply of fluid is cut off in all positions of the valve except "feed", and that in "feed" position both the constant and the intermittent fluid supply are connected.

Operation

For purposes of describing the operation of the machine, assume that the ram 13 stopped before completing its return movement, in which case the reversing valve VR would be in the position shown in Fig. 2, and that the valves VM and VF are in the "stop" position as shown. To start operation of the shaper, the electric motor 31 driving the pump 30 is first started and the discharge of operating fluid regulated by manipulation of the control handle 35. Fluid would then be discharged through the conduit 33 to port 72, thence through groove 74' and port 73 to drain pipe 56 back to the reservoir. To adjust the work in proper relation with respect to the ram 13, the control handle 57 is first swung to "rapid-traverse" position, thereby shifting valve VM to the left to close port 73 and open port 71 to communicate with port 72 and a supply of operating fluid. If the rail 17 is to be adjusted the rail-clamping means are first released and if the rail is to be moved down the control handle 193 is swung clockwise, as viewed in Fig. 2. Operating fluid would then flow through conduit 195, port 196, groove 206, port 199, conduit 191 and duct 140 to the cylinder 136 forcing the rail downwardly. Fluid in the cylinder 135 during the downward movement of the rail is discharged through duct 139, conduit 190, port 201 and conduit 204 to the reservoir through drain pipe 56. If the rail is to be moved upwardly the control handle 193 is swung counterclockwise to the "rail-up" position indicated. Operating fluid then flows from the pump 30 through conduit 33, ports 72 and 71, conduit 195, port 196, groove 206, port 201, conduit 190 and duct 139 to the cylinder 135, thereby forcing the rail upwardly. At the same time fluid in cylinder 136 is discharged through duct 140, conduit 191, port 200, groove 205, port 202, bypass passage 203 and conduit 204 to the reservoir through the drain pipe 56. With the rail positioned at the proper level the valve VF is returned to stop position and the rail clamped.

The table 19 may now be rapid traversed in either direction to its desired position by again swinging the control handle 193 counterclockwise to the "up" or "rapid-traverse" position. Operating fluid is now supplied to the port 196 as heretofore described, thence through groove 206, port 201, conduit 190 and duct 139 to the cylinder 135. The rail being clamped, however, there is no movement of the cylinder and the full pressure of the operating fluid is transmitted through conduit 160 and conduit 183 to port 170 of the rapid traverse valve VT. By shifting the valve VT to the right, port 170 registers with the central radial outlet of the passage 176 and fluid is discharged through the passage to port 171, branch passage 180 and conduit 179 to the motor 27. The circuit for the motor 27 is completed by conduit 178, port 169 which now is connected to port 168, conduit 182 and conduit 161 to the small cylinder 136. From the cylinder 136 the fluid continues through duct 140, conduit 191, ports 200 and 202, bypass passage 203 and conduit 204 to the reservoir. If the valve VT is shifted to the left, port 170 communicates with port 169 and operating fluid is supplied to the motor through the conduit 178 thus driving the motor in the opposite direction. The circuit for the motor is completed by conduit 179, branch passage 181, port 172 which now communicates with the right end of the passage 176, the central radial outlet of which now registers with port 168 to discharge the fluid through conduit 182 to cylinder 136. From cylinder 136 the fluid takes the same course as previously described.

To start operation of the ram 13 the control handle 57 is swung clockwise to the "go" position indicated thereon. The valve VM is now in its extreme right position in which the land 75 cuts off the return port 73 and connects the port 72 with the port 71 and port 70. Operating fluid now flows from the port 70 through duct 90 to the port 79 which by way of groove 84 communicates with port 78 which in turn communicates by duct 92 with the port 46 of cylinder 40, thus supplying operating fluid to complete the return stroke of the ram 13. At this time fluid is prevented from escaping through the outlet port 47 of the cylinder 40 because the conduit 93 leading therefrom is blocked by the land 86 of the valve VR. Fluid from the right end of the cylinder 40 however is discharged through the outlet port 49, conduit 128, port 119, port 120, duct 130, ports 82 and 81, duct 91 to port 73, and thence to the reservoir through the drain pipe 56. Fluid from cylinder 44 is discharged through port 51, conduit 129, port 121 and from there to the reservoir as just described.

Upon completion of the return stroke of the ram 13 the dog 62 strikes the trip lever 61, thereby rotating valve 60 through 45° in a clockwise direction so as to effect communication between ports 99 and 105 and between ports 101 and 102. Operating fluid from the pump 30 now flows through conduit 33, conduit 103 to port 102, thence to port 101, conduit 100 to passage 97 in the plug 96, thereby effecting a reversal of the valve VR. Discharge of the fluid from the opposite end of the valve takes place through the passage 97, conduit 98, ports 99 and 105 and conduit 106 which communicates with the drain pipe 56.

In this position (right) of the reversing valve, operating fluid flows from port 70 through duct 90 to the port 79 which now is in communication through the groove 84 with the port 80, port 78 being cut off by the land 86. From the port 80 the fluid flows through the duct 125 to the port 116. From thence it is conducted, depending upon the position of the speed control valve VS, to both or either of the cylinders 40 and 44, thereby to obtain the desired one of three cutting speeds. With the valve VS in the "low" position, as shown, the port 116 is in communication by means of the groove 122 with both ports 115 and 117 so that operating fluid is supplied to both the head end of cylinder 40 and cylinder 44 through conduits 126 and 127. Because both piston and cylinder devices are now operative, the lowest cutting speed will be obtained as previously described. When the control handle 65 is swung clockwise to the "medium" position, port 115 is cut off so that operating fluid is supplied only to the cylinder 44 through the conduit 127 resulting in medium cutting speed. When the control handle 65 is swung counterclockwise to the "high" position, port 117 is cut off so that operating fluid is now supplied through conduit 126 to the head end of cylinder 40 only, thus giving the maximum cutting speed. It will be apparent that these cutting speeds can be still further varied by controlling the rate of delivery of the pump 30 by manipulation of the control handle 35. When fluid is being supplied to both cylinders, escape of fluid through the outlet ports 49 and 51 is prevented because the port 81 is closed by the land 87 of the reversing valve VR. Upon completion of the forward stroke of the ram 13 at any one of the speeds, the dog 63 contacts the trip lever 61 to reverse the pilot valve 60 and thereby shift the reversing valve VR so as to start a return stroke of the ram.

Prior to commencement of the forward stroke of the ram 13, however, the feed motor 26 is actuated to rotate the feed shaft 145 and thereby impart a predetermined feeding movement to the table 19. This feeding movement is assured because of the back pressure valve 94 disposed in the conduit 93 leading from the exhaust port 47 of the cylinder 40. The back pressure valve 94 provides sufficient resistance to movement of the piston 41 so that fluid in the port 116 first takes the path of least resistance which is through conduit 197 to port 198 of valve VF. With the valve in "feed" position port 198 communicates through groove 205 with the port 200, thence through conduit 191, duct 140 to cylinder 136. The rail 17 being clamped, however, no movement takes place and the pull pump pressure is transmitted through conduit 161 to the lower end of the cylinder 147. Because of the differential piston 148 the fluid overcomes the pressure on the opposite side of the piston and forces the rod 149 outwardly to rock the pawl 151 and thereby impart a feed to the table 19. The fluid in the upper portion of cylinder 147 is forced out through conduit 160, cylinder 135, duct 139, conduit 190, port 201, port 196 and conduit 195 to the port 71 against pump pressure. The piston 148 having been actuated, the operating fluid then acts upon the pistons 41 and 45 to effect the forward stroke of the ram 13. Fluid from the left end of the cylinder 40 is then discharged through the conduit 93 to the port 76 which through groove 83 is in communication with port 77, which communicates through ducts 131 and 132 with the annular port 81 and thence through duct 91 and port 73 to the drain pipe 56. When the reversing valve VR is in the position shown in Fig. 2, operating fluid is cut off from the port 116 and thus from the lower end of cylinder 147 so that the pump pressure constantly maintained in the upper end of the cylinder is free to move the piston 148 downwardly preparatory to a subsequent advance prior to a forward stroke of the ram.

I claim as my invention:

1. A hydraulically operated machine tool comprising a reciprocable carrier, a stationary cylinder, a piston in said cylinder having a rod projecting through one end thereof and into driving engagement with said carrier, said cylinder having an inlet and an exhaust port at each end thereof, a pump for supplying operating fluid, a conduit system connecting with said pump and the ports in said cylinder, and a valve in said conduit system controlling the connections of said system to the ports in said cylinder, said valve having a first position in effect opening the inlet and closing the exhaust port in the head end of said cylinder and closing the inlet and opening the exhaust port in the rod end, and a second position in effect closing the inlet and opening the exhaust port in the head end and opening the inlet and closing the exhaust port in the rod end to effect reciprocation of said carrier and unidirectional flow of fluid through the system.

2. A hydraulically operated machine tool comprising a reciprocable carrier, a double acting piston and cylinder means associated with said carrier to effect reciprocation thereof, a pump for supplying operating fluid to said means, a conduit system having two connections with each end of said cylinder connecting said pump with said piston and cylinder means, and a valve interposed in the system and controlling said connections to supply fluid alternately to opposite ends of said cylinder through one only of said connections to obtain reciprocation of said carriage and unidirectional flow of the fluid through the system.

3. A hydraulically operated machine tool comprising a reciprocable carrier, a stationary cylinder, a piston in said cylinder having a rod projecting through one end thereof and into driving engagement with said carrier, said cylinder having an inlet and an exhaust port at each end thereof, a pump for supplying operating fluid, a conduit system connecting with said pump and the ports in said cylinder, and valve mechanism controlling the course of the fluid through said conduit system to effect reciprocation of said carrier and discharge of fluid into said cylinder only through said inlet ports and discharge from said cylinder only through said outlet ports.

4. A hydraulically operated machine tool comprising a reciprocable carrier having a forward and a return stroke, a first cylinder having an inlet port and an exhaust port, a piston in said cylinder operable to drive said carrier on its forward stroke, a second cylinder, a double acting piston in said second cylinder operable to drive said carrier in either direction, said second cylinder having an inlet and an exhaust port at each end, a pump for supplying operating fluid, a conduit system connecting said pump and said cylinders, and valve mechanism controlling the conduits leading to said ports to effect reciprocation of said carrier and to effect supply of operating fluid to said cylinders only through said inlet ports and discharge from the cylinders only through the exhaust ports.

5. A hydraulically operated machine tool comprising a reciprocable carrier having a forward and a return stroke, a plurality of reciprocable motors for driving said carrier at different speeds, a pump for supplying operating fluid, a conduit system connecting said pump and said motors, a first valve controlling the reversal of said carrier, said valve in one position directing the fluid in said conduit system to one of said motors to effect a return stroke of said carrier and in another position directing the fluid to a plurality of different motors to effect a forward stroke, and a second valve further controlling the fluid directed to the plurality of motors to render the motors individually or jointly operable to vary the speed of the forward stroke of the carrier.

6. A hydraulically operated machine tool comprising a reciprocable carrier, a plurality of motors of different capacities for driving said carrier at different speeds, a pump for supplying a constant volume of operating fluid, a conduit system connecting said pump and said motor, a first valve directing the fluid in said conduit system to one only or to a plurality of said motors to control reversal of said carrier, and a second valve further controlling the fluid directed to a plurality of said motors by said first valve to render the motors selectively operable to vary the speed at which the carrier is driven.

7. A hydraulically operated machine tool comprising a reciprocable carrier having a forward and a return stroke, a plurality of reciprocable motors of different capacities for driving said carrier, a pump for supplying operating fluid, a conduit system connecting said pump and said motors, a first valve controlling the reversal of said carrier, said valve in one position directing the fluid in said conduit system to the motor having the smallest capacity to effect a rapid return stroke of said carrier and in another position directing the fluid to the remainder of said motors to effect a forward stroke, and a second valve further controlling the fluid directed to the remainder of said motors to render the motors selectively operable to vary the speed of the forward stroke of the carrier.

8. A hydraulically operated machine tool comprising a reciprocable carrier, a plurality of motors of different capacities for driving said carrier at different speeds, a pump for supplying operating fluid, a reversing valve for controlling the reversals of said carrier, a connection between said reversing valve and said pump, a first branch circuit controlled by and leading from said reversing valve to one of said motors, a second branch circuit controlled by and leading from said reversing valve to the remainder of said motors, and a speed selector valve interposed in said second branch circuit to render said motors selectively operable to vary the speed of the carrier.

9. A hydraulically operated machine tool comprising a reciprocable carrier, a plurality of motors of different capacities for driving said carrier at different speeds, a pump for supplying operating fluid, a reversing valve for controlling the reversals of said carrier, a connection between said valve and said pump, a first and a second branch circuit leading from and controlled by said reversing valve and each including separate supply and return ducts to permit of unidirectional flow of fluid in said circuits, said first branch leading to one only of said motors, and said second branch leading to the remainder of said motors, and a speed selector valve interposed in said second branch circuit to render said motors selectively operable to vary the speed of the carrier.

10. A hydraulically operated machine tool comprising a reciprocable carrier having a forward and a return stroke, a first cylinder, a piston in said cylinder operable to drive said carrier on its forward stroke, a second cylinder smaller than said first, a double acting piston in said cylinder operable to drive said carrier in either direction, a pump for supplying operating fluid, a conduit system connecting said pump and said cylinders, a first valve controlling the reversal of said carrier, said valve in one position directing the fluid in said conduit system to one end only of said smaller cylinder to effect a return stroke of said carrier and in another position directing the fluid to the other end of said small cylinder and to said large cylinder to effect a forward stroke, and a second valve further controlling the fluid supplied to effect a forward stroke to render the pistons selectively operable to vary the speed of the forward stroke.

11. A hydraulically operated machine tool comprising a reciprocable carrier having a forward and a return stroke, a first cylinder having an inlet and an exhaust port, a piston in said cylinder operable to drive said carrier on its forward stroke, a second cylinder smaller than said first, a double acting piston in said cylinder having a rod projecting through one end thereof and operable to drive said carrier in either direction, said second cylinder having an inlet and an exhaust port at each end, a pump for supplying operating fluid, a conduit system connecting said pump and said cylinders, a first valve controlling the reversal of said carrier, said valve in one position directing the fluid in said system only to the rod end of said second cylinder to effect a rapid return stroke of said carrier and in another position directing the fluid to the other end of said second cylinder and to said first cylinder to effect a forward stroke, and a second valve further controlling the fluid directed to both cylinders to selectively supply any one or both of the cylinders with fluid to vary the speed of the forward stroke of the carrier.

12. A hydraulically operated machine tool comprising a reciprocable carrier having a forward and a return stroke, a plurality of reciprocable motors of different capacities for driving said carrier, a pump for supplying operating fluid, a conduit system connecting said pump and said motors, a first valve controlling the reversal of said carrier, said valve in one position directing the fluid in said conduit system to one of said motors to effect a return stroke of said carrier and in another position directing the fluid to a plurality of different motors to effect a forward stroke, and a second valve further controlling the fluid directed to the plurality of motors to render the motors selectively operable to vary the speed of the forward stroke of the carrier, said conduit system being arranged and said valve directing the fluid to obtain a unidirectional flow of fluid in the system.

13. A hydraulically operated machine tool comprising a translatable tool carrier, a translatable work carrier, a hydraulic motor for driving said tool carrier, a second hydraulic motor for driving said work carrier, a pump for supplying operating fluid, a conduit system connecting said pump and said motors, automatic valve means for controlling the fluid in said system to continually impart to said tool carrier a forward and a return stroke, and a back-pressure valve for assuring operation of said second motor prior to a forward stroke of said tool carrier for accomplishing a progressive displacement between said two carriers to present fresh portions of the work successively to the action of the advancing tool in said tool carrier.

14. A hydraulically operated machine tool comprising a translatable tool carrier, a translatable work carrier, a double acting piston and cylinder device associated with said tool carrier, fluid supply and return connections to both ends of said device, a pump for supplying operating fluid, a reversing valve alternately directing fluid to opposite ends of said device to effect a forward and a return stroke of said tool carrier, a hydraulic motor for driving said work carrier connected in parallel with the end of said device imparting a forward stroke to said tool carrier, and a back-pressure valve in the return connection from the other end of said device causing operation of said hydraulic motor prior to a forward stroke of said tool carrier for accomplishing a progressive lateral displacement between said carriers.

15. In a machine tool, a column, a work table supporting rail mounted for vertical adjustment on said column and hydraulic means for adjusting said rail comprising a downwardly opening cylinder integral with said rail, an upwardly opening cylinder smaller than said first cylinder also integral with said rail, a piston for each of said cylinders and having its projecting end fixed in said column, a duct extending longitudinally through each of said pistons, a pump for supplying operating fluid located in said column, and means including valve mechanism for selectively supplying fluid to one or the other of said cylinders to raise or lower said rail.

16. In a machine tool, a column, a rail mounted for vertical adjustment on said column, a carrier slidable on said rail, a hydraulic means for raising or lowering said rail adapted to have a rigid fluid supply connection, a hydraulic motor for effecting feed of said carrier, and a hydraulic motor for effecting rapid traverse of said carrier, both of said motors being mounted on said rail and deriving operating fluid from said hydraulic means so as to be supplied from said rigid connection.

17. In a machine tool, a column, a rail mounted for vertical adjustment on said column, a work supporting table slidable on said rail, piston and cylinder means for actuating said rail, said piston being fixed at one end in said column and having a duct extending therethrough to form an operating fluid supply connection, a hydraulic motor for effecting feed of said table, and a hydraulic motor for effecting rapid traverse of said table, both of said motors being mounted on said rail and having a connection with said piston and cylinder means to derive operating fluid therefrom.

18. In a machine tool, a column, a rail mounted for vertical adjustment on said column, a work supporting table slidable on said rail, hydraulic means for raising or lowering said rail, means for clamping said rail in adjusted position, a first hydraulic motor for effecting feed of said table, a second hydraulic motor for rapid traversing said table, and a fluid valve system operable to effect adjustment of the rail, or feed or rapid traverse of said table as desired.

19. In a machine tool, a column, a rail mounted for vertical adjustment on said column, a work supporting table slidable on said rail, hydraulic means for raising or lowering said rail, means for clamping said rail in adjusted position, a first hydraulic motor for effecting feed of said table, a second hydraulic motor for rapid traversing said table, and a fluid supply system including a valve having connection to a constant and to an intermittent supply of operating fluid, said valve being shiftable to connect the system to the constant supply to raise or lower said rail and to rapid traverse said table, and to connect the system to the intermittent supply to feed the table.

20. In a machine tool, a column, a rail mounted for vertical adjustment on said column, a work supporting table slidable on said rail, hydraulic means for raising or lowering said rail, means for clamping said rail in adjusted position, a differential piston and cylinder device for effecting feed of said table, a hydraulic motor for rapid traversing said table, and a fluid supply system including a valve having a connection to a constant and to an intermittent supply of operating fluid, said valve being shiftable to cut off the intermittent supply and connect the constant supply to raise or lower said rail when the rail is unclamped and to rapid traverse said table when the rail is clamped, and to connect both said constant and said intermittent supply to said differential piston and cylinder device to effect intermittent feed of said table.

21. A hydraulically operated machine tool comprising, in combination, a translatable tool carrier, a translatable work carrier, a hydraulic motor for actuating said tool carrier, a pump for supplying operating fluid, a conduit system connecting said pump and said motor including a reversing valve for controlling the fluid to effect forward and return strokes of said tool carrier, a differential piston and cylinder device for intermittently feeding said work carrier, a connection between said pump and said device constantly exposing the small end thereof to full pump pressure, and a conduit controlled by said reversing valve intermittently supplying full pump pressure to the large end of said device to effect a feed of the work support prior to a forward stroke of said tool carrier.

22. A hydraulic shaper comprising, in combination, a column, a tool-carrying ram reciprocably mounted on said column, a hydraulic motor for reciprocating said ram, a pump for supplying operating fluid, a conduit system including a reversing valve for supplying operating fluid from said pump to said hydraulic motor, a rail mounted for vertical adjustment on said column, a work supporting table slidable on said rail, hydraulic means for raising or lowering said rail, means for clamping said rail in adjusted position, a hydraulic motor for effecting feed of said table, a hydraulic motor for rapid traversing said table, and a fluid supply system connecting said hydraulic means and last named motors including a valve, a connection from said valve to said pump to obtain a constant supply of operating fluid, and a connection from said valve to said reversing valve to obtain an intermittent supply of operating fluid, said valve being shiftable to connect the constant supply to raise or lower said rail and to rapid traverse said table and to connect both the intermittent and the constant supply to effect feed of the table.

23. In a machine tool, a column, a rail mounted on said column, a work supporting table slidable on said rail, a feed screw mounted on said rail and engaging said table to effect movement thereof, a reciprocatory hydraulic motor having a connection with said feed screw for intermittently feeding said table, a rotary hydraulic motor having a permanent connection with said feed screw for rapid traversing said table, a four-way valve controlling the supply of fluid to said rotary motor and having a neutral position permitting free circulation of fluid through the valve and the rotary motor in either direction, and a fluid valve supply system for supplying operating fluid to said motors.

24. In a machine tool, a column, a rail mounted for vertical adjustment on said column, oppositely opening cylinders carried by said rail, a piston for each of said cylinders fixed at its projecting end in the column, a pump for supplying operating fluid, connections from said pump to each of said cylinders including a passage in said pistons, means for clamping said rail in adjusted position, a work supporting table slidable on said rail, a differential piston and cylinder device for effecting intermittent feed of said table, a hydraulic motor for effecting rapid traverse movement of said table, a valve controlling the supply of operating fluid to said hydraulic motor, a connection from one of said cylinders to said rapid traverse motor valve and to one end of said differential piston and cylinder device, a connection from the other cylinder to said rapid traverse motor valve and to the other end of said differential piston and cylinder device, and a system for supplying operating fluid to said cylinders including a valve for directing the fluid to one or the other of said cylinders.

25. A shaper comprising, in combination, a column; a tool-carrying ram reciprocably mounted on said column; hydraulic means for reciprocating said ram; a pump for supplying operating fluid; a conduit system including a reversing valve connecting said pump and said hydraulic means; a rail mounted for vertical adjustment on said column; a pair of oppositely opening cylinders carried by said rail; a piston for each of said cylinders having its projecting end fixed in said column; each of said pistons having a fluid supply duct extending therethrough and having rigid connection with a duct in said column; means for clamping said rail in adjusted position; a work supporting table slidable on said rail; a differential piston and cylinder device mounted on said rail and operable to effect intermittent feed of said table; a hydraulic motor also mounted on said rail and operable to effect rapid traverse movement of said table; a valve mounted on the rail controlling the fluid supplied to said hydraulic motor; one of said cylinders having a connection to said valve and to the small end of said differential piston; the other of said cylinders having a connection to said valve and the large end of said differential piston; a control valve mounted in said column and having a separate connection with each of said cylinders, a connection to a constant supply if operating fluid, and a connection to said reversing valve providing an intermittent supply of operating fluid; said valve being shiftable to cut off said intermittent supply and connect said cylinders to said constant supply for effecting adjustment of said rail or rapid traverse movement of said table and to connect said constant supply to the small end of said differential piston and the intermittent supply to the large end of said differential piston to effect intermittent feed of said table.

26. In a hydraulic actuating system, a cylinder, a piston reciprocable in said cylinder and projecting at one end therefrom, said piston being of a diameter less than the inner diameter of said cylinder to permit communication between opposite ends of the cylinder, an inlet port at one end of said cylinder, an outlet port at the opposite end of said cylinder, a conduit connected to said inlet port, and a conduit connected to said outlet port, and a valve controlling said conduits having a first position closing said outlet conduit and directing fluid through said inlet conduit to impart a working stroke to said piston and a second position closing said inlet conduit and opening said outlet conduit to permit discharge therethrough upon a return stroke of said piston to maintain a unidirectional flow of fluid through said conduits and also said cylinder.

27. In a hydraulic actuating system, a member to be driven, a plurality of motors for driving said member at different speeds, a pump for supplying operating fluid, a conduit system connecting said pump and said motors, and a single valve controlling the fluid supplied to the plurality of motors to render any one or more of the motors operable to vary the speed at which the member is driven.

28. In a hydraulic actuating system, a member to be reciprocated, three motors for reciprocating said member each being of a different volumetric capacity, a pump for supplying operating fluid at a constant volume, a conduit system connecting said pump and said motors, and valve means for directing the fluid in said conduit system to one of said motors to effect movement of said member in one direction and for directing fluid to any one of the remaining motors to effect movement of said member in the opposite direction, and at any one of three speeds distinct from the speed in the first mentioned direction.

29. A hydraulically operated machine tool comprising a reciprocable member, a plurality of motors for driving said member at different speeds, a pump for supplying operating fluid, a conduit system connecting said pump and said motors, a first valve controlling the reversal of said member, said valve in one position directing the fluid in said conduit system to one of said motors to effect a stroke of said member in one direction and in another position directing the fluid to a plurality of different motors to effect a stroke of the member in the opposite direction, and a second valve further controlling the fluid directed to the plurality of motors to render any one or more of the motors operable to vary the speed of the member in said last named direction.

30. In a hydraulic actuating system, a member to be reciprocated, a first piston and cylinder device, a second piston and cylinder device, and a third piston and cylinder device, each connected to drive said member and each being of a different volumetric capacity, a pump for supplying operating fluid at a constant volume, a conduit system connecting said pump and said motors, and valve means for directing the fluid in said conduit system to one of said motors to effect movement of said member in one direction and for directing fluid to any one or more of the remaining motors to effect movement of said member in the opposite direction and at any one of three speeds distinct from the speed in the first mentioned direction.

31. A hydraulically operated shaper comprising a reciprocable tool carrying ram having a forward and a return stroke, a plurality of motors for reciprocating said ram at different speeds, a pump for supplying operating fluid, a conduit system connecting said pump and said motors, and valve means for directing the fluid in said conduit system to one of said motors to effect a stroke of said ram in one direction and for directing fluid to any one or more of a plurality of different motors to effect a stroke of said ram in the opposite direction and at different speeds.

32. A hydraulically operated shaper comprising a reciprocable ram having a forward and a return stroke, a plurality of reciprocable motors all of different volumetric capacity for driving said ram at different speeds, a pump for supplying operating fluid, a conduit system connecting said pump and said motors, a first valve controlling the reversal of said ram, said valve in one position directing the fluid in said conduit system to only the smallest of said motors to effect a rapid return stroke of said ram, and in another position directing the fluid to a plurality of different motors having a larger volumetric capacity to effect a forward feed stroke of said ram, and a second valve further controlling the fluid directed to the plurality of motors to render the motors selectively operable to vary the speed of the forward stroke of the ram.

33. A hydraulically operated machine tool comprising a translatable tool carrier, a translatable work carrier, a reversible hydraulic motor associated with said tool carrier, a pump for supplying operating fluid, a conduit system connecting said pump and said motor, a reversing valve alternately directing fluid to said motor in opposite directions to effect a forward and a return stroke of said tool carrier, a hydraulic motor for driving said work carrier connected in said conduit system to receive operating fluid when the reversing valve directs fluid to impart a forward stroke to said tool carrier, and means operative during the forward stroke of said tool carrier to resist movement thereof to assure operation of the hydraulic motor for said work carrier prior to a forward stroke of said tool carrier for accomplishing a progressive lateral displacement between said carriers.

34. In a machine tool a column, a rail mounted for vertical adjustment on said column, a hydraulic means for adjusting said rail vertically of said column comprising a cylinder carried by said rail and a piston reciprocable in said cylinder and having its projecting end fixed in said column, a duct extending longitudinally through said piston, a pump for supplying operating fluid located in said column, and a valve controlling the supply of fluid to said cylinder to govern vertical adjustment of the rail.

35. In a hydraulic actuating mechanism for a machine tool, a reciprocable hydraulic motor, a pump for supplying operating fluid to said motor, a conduit system connecting said pump with said motor, and a valve in said conduit system controlling the flow of fluid therein and having a first position directing fluid to one end of said motor, and a second position directing fluid to the opposite end of said motor to effect reciprocation thereof, said conduit system being constructed so that said valve in both positions connects the system to direct all of the exhaust fluid from said motor to said pump before re-entry of any portion thereof into said motor.

36. A hydraulically operated machine tool comprising a reciprocable carrier, a plurality of motors of different capacities for driving said carrier at different speeds, a pump for supplying operating fluid, a reversing valve, a connection between said reversing valve and said pump, a first and a second branch circuit leading from said reversing valve to said motors and controlled by said reversing valve to control the reversals of said carrier, and a selector valve interposed in one of said branch circuits to direct the fluid to one or more of the motors to vary the speed of the carrier.

37. A machine tool comprising a plurality of hydraulic motors, a movable tool carrier driven by one of said motors, a movable work carrier driven by the other of said motors, an automatic fluid valve system for supplying fluid to said motors for continually imparting to one of said carriers a forward and a return stroke and for intermittently actuating the other of said carriers to accomplish a progressive lateral displacement between said two carriers to present fresh portions of the work successively to the action of the tool, and means operative during the forward stroke of said reciprocating carrier to resist movement thereof to assure operation of the intermittently actuated carrier prior to a forward stroke of the reciprocating carrier.

38. A machine tool comprising a frame, a source of operating fluid, a carrier reciprocable upon said frame, a hydraulic motor for driving said carrier, a rail vertically movable on said frame, a carrier slidable upon said rail, one of said carriers being a work carrier and the other a tool carrier, a hydraulic motor for effecting movement of said slidable carrier mounted on said rail and having a fluid supply connection with the source of operating fluid composed of rigid parts, and a fluid valve system operable to control the supply of fluid to said motors.

39. In a machine tool, a column, a rail mounted for vertical adjustment on said column, a cylinder carried by said rail, a longitudinally passaged member reciprocable in said cylinder and having its projecting end fixed in said column, a carrier mounted on said rail, a hydraulic motor mounted on said rail for actuating the carrier, a fluid connection between said motor and said cylinder, and a pump for supplying operating fluid having a connection with the end of the passaged member fixed in the column.

40. In a machine tool, a frame, a rail vertically movable on said frame, a hydraulic means for moving said rail vertically, a carrier slidable upon said rail, a first hydraulic motor for effecting feed of said carrier, a second hyldraulic motor for rapid traversing said carrier, and a fluid valve system operable at will to effect selectively vertical movement of said rail, feed movement of said slidable carrier, and rapid traverse movement of said slidable carrier.

PAUL S. JACKSON.